(12) United States Patent
Morrison et al.

(10) Patent No.: US 6,709,230 B2
(45) Date of Patent: Mar. 23, 2004

(54) CERAMIC MATRIX COMPOSITE GAS TURBINE VANE

(75) Inventors: Jay A. Morrison, Ovledo, FL (US); Chris Campbell, Orlando, FL (US); Gary Brian Merrill, Orlando, FL (US); Jay Edgar Lane, Murrysville, PA (US); Daniel George Thompson, Pittsburgh, PA (US); Harry A. Albrecht, Hobe Sound, FL (US); Yevgeniy P. Shteyman, West Palm Beach, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 35 days.

(21) Appl. No.: 10/158,946

(22) Filed: May 31, 2002

(65) Prior Publication Data

US 2003/0223861 A1 Dec. 4, 2003

(51) Int. Cl.[7] ................................. F01D 9/04
(52) U.S. Cl. ..................... 415/115; 415/200; 416/97 R; 416/97 A; 416/229 A; 416/224; 416/241 B
(58) Field of Search ................ 415/115, 200; 416/97 R, 97 A, 229 R, 229 A, 224, 241 B

(56) References Cited

U.S. PATENT DOCUMENTS

| | | |
|---|---|---|
| 3,910,716 A | 10/1975 | Roughgarden et al. |
| 4,396,349 A | 8/1983 | Hueber |
| 4,519,745 A | 5/1985 | Rosman et al. |
| 4,530,884 A | 7/1985 | Erickson et al. |
| 4,563,125 A | 1/1986 | Boudigues et al. |
| 4,563,128 A | 1/1986 | Rossmann |
| 4,629,397 A | 12/1986 | Schweitzer |
| 4,639,189 A | 1/1987 | Rosman |
| 4,643,636 A | 2/1987 | Libertini et al. |
| 4,645,421 A | 2/1987 | Huether |
| 4,768,924 A | 9/1988 | Carrier et al. |
| 4,790,721 A | 12/1988 | Morris et al. |
| 4,838,031 A | 6/1989 | Cramer |
| 4,907,946 A | 3/1990 | Ciokajlo et al. |
| 5,027,604 A | 7/1991 | Krueger |
| 5,226,789 A | 7/1993 | Donges |
| 5,306,554 A | 4/1994 | Harrison et al. |
| 5,314,309 A | 5/1994 | Blakeley et al. |
| 5,328,331 A | 7/1994 | Bunker et al. |
| 5,358,379 A | 10/1994 | Pepperman et al. |
| 5,375,978 A | 12/1994 | Evans et al. |
| 5,382,453 A | 1/1995 | Mason |
| 5,484,258 A | 1/1996 | Isburgh et al. |
| 5,493,855 A | 2/1996 | Walters et al. |
| 5,494,402 A | 2/1996 | Glezer et al. |
| 5,584,652 A | 12/1996 | Shaffer et al. |
| 5,605,046 A | 2/1997 | Liang |
| 5,616,001 A | 4/1997 | Boyd |
| 5,630,700 A | 5/1997 | Olsen et al. |
| 5,640,767 A | 6/1997 | Jackson et al. |

(List continued on next page.)

Primary Examiner—Ninh H. Nguyen

(57) ABSTRACT

A hybrid vane (50) for a gas turbine engine having a ceramic matrix composite (CMC) airfoil member (52) bonded to a substantially solid core member (54). The airfoil member and core member are cooled by a cooling fluid (58) passing through cooling passages (56) formed in the core member. The airfoil member is cooled by conductive heat transfer through the bond ((70) between the core member and the airfoil member and by convective heat transfer at the surface directly exposed to the cooling fluid. A layer of insulation (72) bonded to the external surface of the airfoil member provides both the desired outer aerodynamic contour and reduces the amount of cooling fluid required to maintain the structural integrity of the airfoil member. Each member of the hybrid vane is formulated to have a coefficient of thermal expansion and elastic modulus that will minimize thermal stress during fabrication and during turbine engine operation.

36 Claims, 2 Drawing Sheets

U.S. PATENT DOCUMENTS

| | | |
|---|---|---|
| 5,720,597 A | 2/1998 | Wang et al. |
| 5,791,879 A | 8/1998 | Fitzgerald et al. |
| 5,820,337 A | 10/1998 | Jackson et al. |
| 6,000,906 A | 12/1999 | Draskovich |
| 6,164,903 A | 12/2000 | Kouris |
| 6,197,424 B1 | 3/2001 | Morrison et al. |
| 6,200,092 B1 | 3/2001 | Koschier |
| 6,241,469 B1 | 6/2001 | Beeck et al. |
| 6,280,550 B1 * | 8/2001 | Steibel et al. ............... 156/182 |
| 6,325,593 B1 | 12/2001 | Darkins, Jr. et al. |
| 6,368,663 B1 | 4/2002 | Nakamura et al. |
| 6,514,046 B1 * | 2/2003 | Morrison et al. ....... 416/229 A |
| 6,554,563 B2 * | 4/2003 | Noe et al. ................... 415/115 |

* cited by examiner

CERAMIC MATRIX COMPOSITE GAS TURBINE VANE

FIELD OF THE INVENTION

This invention relates generally to the field of gas turbine engines, and more particularly to an internally cooled hybrid ceramic matrix composite vane.

BACKGROUND OF THE INVENTION

Gas turbine engines are known to include a compressor section for supplying a flow of compressed combustion air, a combustor section for burning a fuel in the compressed combustion air, and a turbine section for extracting thermal energy from the combustion air and converting that energy into mechanical energy in the form of a shaft rotation. Many parts of the combustor section and turbine section are exposed directly to the hot combustion gasses, for example the combustor, the transition duct between the combustor and the turbine section, and the turbine stationary vanes, rotating blades and surrounding ring segments.

It is also known that increasing the firing temperature of the combustion gas may increase the power and efficiency of a combustion turbine. Modern, high efficiency combustion turbines have firing temperatures in excess of 1,600° C., which is well in excess of the safe operating temperature of the structural materials used to fabricate the hot gas flow path components. Accordingly, several methods have been developed to permit operation of these materials in this environment. These include film cooling, backside cooling and thermal barrier coatings.

Film cooling involves the delivery of a film of cooling fluid, such as compressed air extracted from the compressor section, between the structural component and the flow of hot combustion gasses. The film of cooling fluid may be provided from a bleed flow from the compressor through holes formed in the surface of the component to be cooled. Film cooling systems are generally very effective in cooling a component, however they may significantly reduce the efficiency of the machine. Energy is needed to compress the cooling fluid, a decrease in combustion gas temperature is induced by the addition of the relatively cold fluid, and disturbance may be created in the smooth flow of air over an airfoil component such as a blade or vane.

Backside cooling generally involves the passage of a cooling fluid over a backside of a component that has a front side exposed to the hot combustion gasses. The cooling fluid in backside cooling schemes may be compressed air that has been extracted from the compressor or steam that is available from other fluid loops in a combustion turbine power plant. Backside cooling does not affect the exhaust gas composition or the flow of air over an airfoil component, it does not dilute the hot combustion air with colder fluid, and it can generally be supplied at a lower pressure than would be needed for film cooling. However, backside cooling creates a temperature gradient across the thickness of the cooled wall, and thus becomes decreasingly effective as the thickness of the component wall increases and as the thermal conductivity of the material decreases.

Insulation materials such as ceramic thermal barrier coatings (TBC's) have been developed for protecting temperature-limited components. While TBC's are generally effective in affording protection for the current generation of combustion turbine machines, they may be limited in their ability to protect underlying metal components as the required firing temperatures for next-generation turbines continue to rise.

Ceramic matrix composite (CMC) materials offer the potential for higher operating temperatures than do metal alloy materials due to the inherent nature of ceramic materials. This capability may be translated into a reduced cooling requirement that, in turn, may result in higher power, greater efficiency, and/or reduced emissions from the machine. However, CMC materials generally are not as strong as metal, and therefore the required cross-section for a particular application may be relatively thick. Due to the low coefficient of thermal conductivity of CMC materials and the relatively thick cross-section necessary for many applications, backside closed-loop cooling is generally ineffective as a cooling technique for protecting these materials in combustion turbine applications. Accordingly, high temperature insulation for ceramic matrix composites has been described in U.S. Pat. No. 6,197,424 B1, which issued on Mar. 6, 2001, and is commonly assigned with the present invention. That patent describes an oxide-based insulation system for a ceramic matrix composite substrate that is dimensionally and chemically stable at a temperature of approximately 1600° C. That patent also describes a stationary vane for a gas turbine engine formed from such an insulated CMC material. A similar gas turbine vane 10 is illustrated in FIG. 1 as including an inner wall 12 and stiffening ribs 14 formed of CMC material covered by an overlying layer of insulation 16. Backside cooling of the inner wall 12 is achieved by convection cooling, e.g. via direct impingement through supply baffles (not shown) situated in the interior chambers 18 using air directed from the compressor section of the engine.

If baffles or other means are used to direct a flow of cooling fluid throughout the airfoil member for backside cooling and/or film cooling, the cooling fluid is typically maintained at a pressure that is in excess of the pressure of the combustion gasses on the outside of the airfoil so that any failure of the pressure boundary will not result in the leakage of the hot combustion gas into the vane. Such cooling passages must generally have a complex geometry in order to provide a precise amount of cooling in particular locations to ensure an adequate degree of cooling without over-cooling of the component. It is generally very difficult to form such complex cooling passages in a ceramic matrix composite component. Alternatively, large central chambers 18 as illustrated in FIG. 1 may be used with appropriate baffling to create impingement of the cooling fluid onto the backside of the surface to be cooled. Such large chambers create an internal pressure force that can result in the undesirable ballooning of the airfoil structure due to the internal pressure of the cooling fluid applied to the large internal surface area of the passage 18. Furthermore, the geometry of FIG. 1 is also limited by stress concentrations at the intersection of the stiffening ribs 14 and the inner wall 12.

Even higher operating temperatures are envisioned for future generations of combustion turbine machines. Accordingly, further improvements in the design of ceramic matrix composite airfoils and the cooling of such airfoils are needed.

SUMMARY OF THE INVENTION

Accordingly, a hybrid turbine component is described herein as including a CMC airfoil member defining a core region and a core member bonded to the airfoil member within the core region. The core member includes cooling channels for the passage of a cooling fluid for removing heat from the CMC material through the bond. The cooling passage may be formed as a groove on an outside surface of the core member, thereby providing both convective and conductive cooling of the CMC member. By bonding the core member to at least 30% of the inside area of the CMC airfoil member, the internal stress caused by the cooling fluid pressure is reduced. An insulating material may be deposited over the CMC airfoil member to reduce the cooling flow requirements. The materials properties of the various components are selected to minimize the stresses in the system.

BRIEF DESCRIPTION OF THE DRAWINGS

These and other advantages of the invention will be more apparent from the following description in view of the drawings that show.

DETAILED DESCRIPTION OF THE INVENTION

Figure 2:
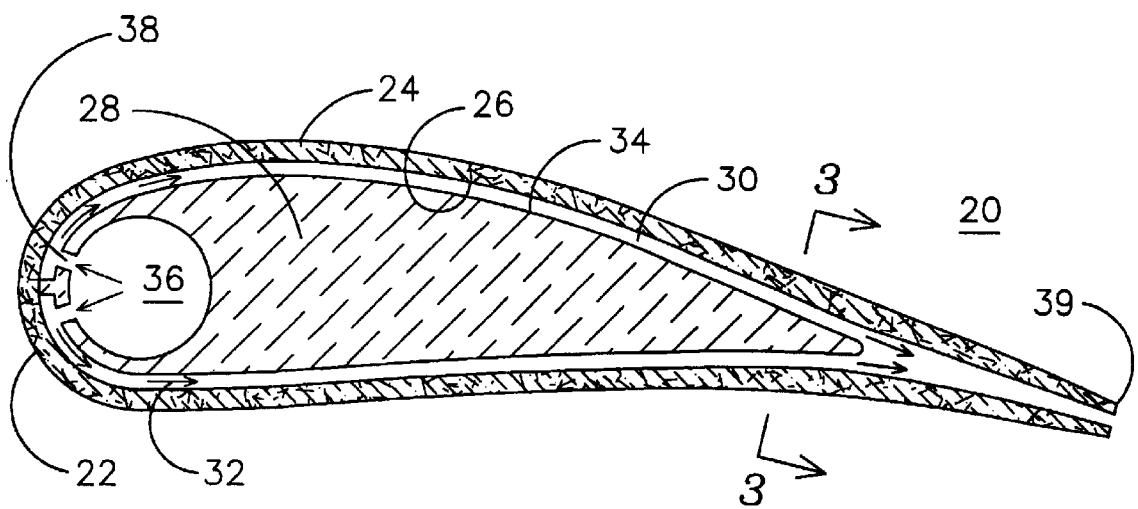
FIG. 2 is a cross-section view of a solid-core ceramic matrix composite gas turbine vane.
Figure 3:
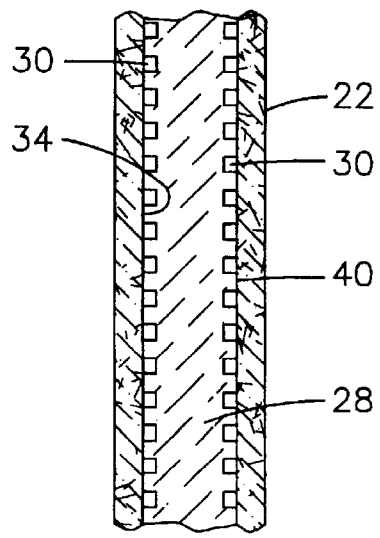
FIG. 3 is a cross-section of the vane of FIG. 2 as viewed along Section 3—3.
Figure 4:
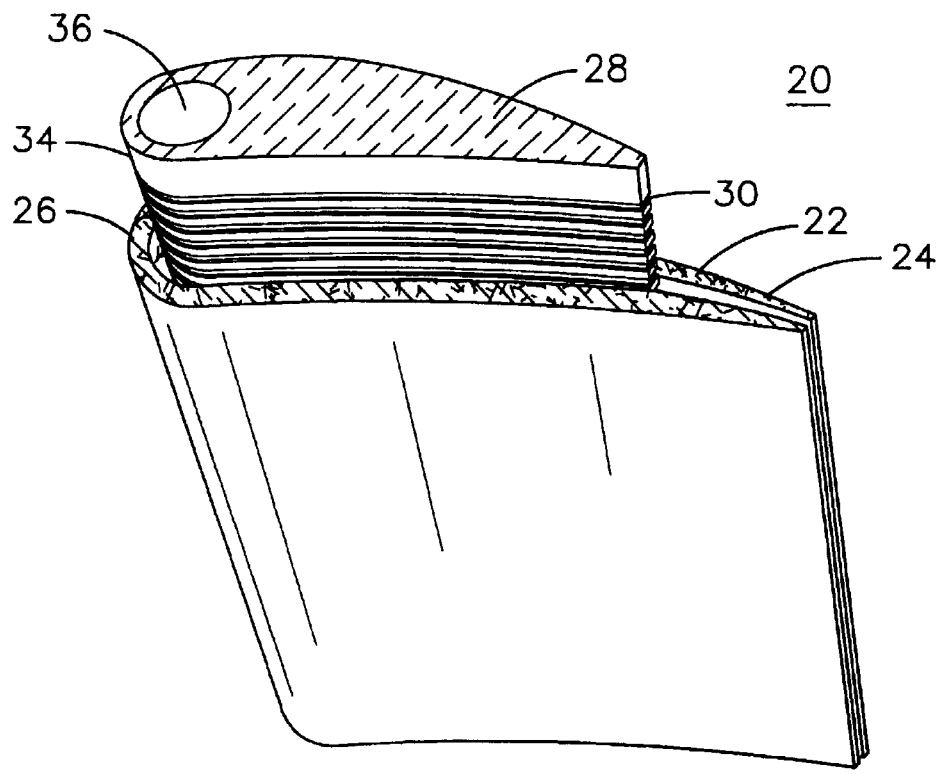
FIG. 4 is a perspective view of the vane of FIG. 2 with the core member partially inserted prior to being bonded to the CMC airfoil member.

FIGS. 2–4 illustrate an improved stationary vane 20 for a gas turbine engine. The vane 20 includes an airfoil member 22 formed from a ceramic matrix composite material having an outer surface 24 defining an airfoil and an inner surface 26 defining a core region. The term ceramic matrix composite is used herein to include any fiber-reinforced ceramic matrix material as may be known or may be developed in the art of structural ceramic materials. The fibers and the matrix material surrounding the fibers may be oxide ceramics or non-oxide ceramics or any combination thereof. A wide range of ceramic matrix composites (CMCs) have been developed that combine a matrix material with a reinforcing phase of a different composition (such as mulite/silica) or of the same composition (alumina/alumina or silicon carbide/silicon carbide). The fibers may be continuous or long discontinuous fibers. The matrix may further contain whiskers, platelets or particulates. Reinforcing fibers may be disposed in the matrix material in layers, with the plies of adjacent layers being directionally oriented to achieve a desired mechanical strength.

A core member 28 is disposed within the core region of airfoil member 22. The core member 28 is preferably formed from a different material than the airfoil member 22, for reasons that will be explained in more detail below. One or more cooling passages 30 are formed in the core member 28 for passing a cooling fluid 32 to remove heat from the vane 20. In this embodiment, the cooling passages 30 are partially defined by grooves formed into an outer surface 34 of the core member 28. Alternatively, the cooling passages may be holes formed below the outer surface 34 of the core member 28, preferably proximate the outer surface 34 to promote heat transfer between the outer surface 34 and the cooling fluid 32. A plenum 36 is formed in the core member 28 for the introduction of the cooling fluid 32 at one end of the vane 20. Openings 38 connect the plenum 36 and respective ones of the cooling passages 30 for the passage of cooling fluid 32. The size of the plenum is selected to maintain the pressure of the cooling fluid 32 within a predetermined range at each of the plurality of openings 38 along the length of the vane 20. The cooling fluid 32 passes along the cooling passages 30 and eventually exits the vane 20 along its trailing edge 39.

The outer surface 34 of the core member 28 is attached to the inner surface 26 of airfoil member 22 by a bond 40, as may be best seen in FIG. 3. The bond 40 may be a layer of adhesive, or it may be a sintered bond joint created by curing the adjoining core member 28 and airfoil member 22 materials together. The bond 40 provides a heat removal pathway for conductive transfer of heat energy away from the airfoil member 22 into the core member 28, and in turn into the cooling fluid 32. In the embodiment illustrated, there will be some direct heat transfer from the airfoil member 22 to the cooling fluid 32, since the inner surface 26 of the airfoil member 22 forms part of the pressure boundary for the cooling passage 30. Such direct heat transfer between the airfoil member 22 and the cooling fluid 32 will not occur in embodiments where the cooling passage 30 is formed as a subsurface hole in the core member 28. To ensure an adequate heat transfer between the core member 28 and the airfoil member 22, the outer surface 34 of the core member 28 may be bonded to at least 30% of the area of the inner surface 26 of the airfoil member 22. In other embodiments, the core member 28 may be bonded to at least 50% or at least 75% or at least 80% of the inner surface 26 of the airfoil member 22. In one embodiment, the width of the grooves forming the cooling passages 30 is 3 mm and the distance between adjacent cooling passages is 12 mm, providing a bond of approximately 80% of the inner surface 26 of the airfoil member 22 to the outer surface 34 of the core 28.

Figure 1:
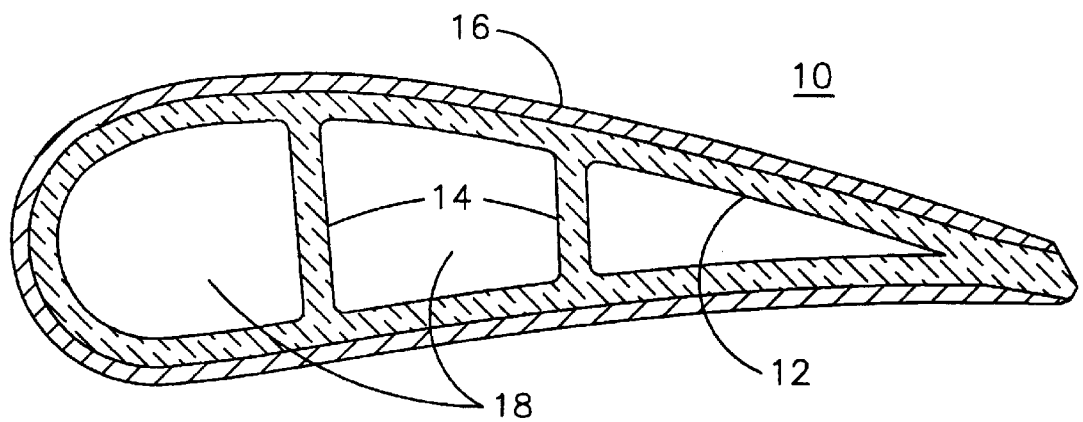
FIG. 1 is a cross-sectional view of a prior art gas turbine vane made from a ceramic matrix composite material covered with a layer of ceramic thermal insulation.

The ceramic matrix composite material of the airfoil member 22 provides mechanical strength necessary to withstand the thermal and mechanical stresses imposed on the vane 20. The core member 28 substantially fills the hollow center of the airfoil member 22 and limits the area of the inner surface 26 that is exposed to the internal pressure loads created by the high pressure cooling fluid 32 and eliminating the ballooning effect experienced with the prior art design of FIG. 1. The reduction of such internal pressure loads is especially beneficial near the trailing edge 39 where the thickness of the CMC material of the airfoil member 22 may be reduced. The core member 28 also provides a damping effect on the dynamics of the vane 20, increasing the rigidity and stiffness of the vane 20 and providing a robust product that is more impact resistant and that may produce a reduced level of acoustic noise than prior art designs. Moreover, the core member 28 provides a much simpler mechanism for defining cooling channels 30 than the prior art techniques of forming passages within the CMC laminate or forming passages by using an internal metal sheath or baffle structure. The cooling passages 30 may be formed on the outer surface 34 of core member 28 by casting the part to include the passages or by machining the passages 30 into the surface 34. Airfoil member 22 may be formed first and used as a mold for the casting of the core member 28. For such a process, a fugitive material may be used to define the space for the passages 30 during the casting of the core member 28. The fugitive material is then removed by heating during a subsequent process step to create the cooling passages 30. Typical fugitive materials include wax, plastic, polystyrene, etc.

The material of construction of the core member 28 affects the performance of vane 20 in the environment of a gas turbine engine. Material properties of particular importance are discussed below.

Because the airfoil member 22 is exposed to higher temperatures than the core member 28, the relative thermal expansion of these two materials may cause tensile stresses throughout the airfoil member 22 and bond 40. Accordingly, it may be desired that the coefficient of thermal expansion (CTE) of the core member 28 be greater than the CTE of the airfoil member 22, in one embodiment at least 10% greater. Other embodiments may have a CTE of the core member 28 that is about 7% greater than the CTE of the airfoil member 22, or in the range of >0 to 14% greater. For other applications, it may be acceptable to have the CTE of the core member 28 in the range of 94% to 120% of the CTE of the airfoil member 22. This difference in thermal expansion coefficients will at least partially compensate for the difference in temperature ranges experienced by the respective materials, thereby more closely matching the physical growth of the materials and minimizing the amount of thermal stress induced in the vane 20.

In order to safeguard the integrity of the heat removal pathway through the bond 40, it may be desired that the mechanical strength of the core member 28 be less than the mechanical strength of the bond 40 between the airfoil member 22 and the core member 28. Cracking of the airfoil member 22 material could result in the undesirable leakage of the cooling fluid 32 into the combustion gas flow. Delamination of the bond 40 could result in the loss of cooling of the airfoil member 22. Accordingly, it may be desired to maintain the core member 28 as the mechanical weak link in the structure by using a material that has a tensile strength that is less than the tensile strength of the bond 40 and the airfoil member 22.

The core member 28 may be designed to be strain tolerant in order to relax the loads imposed by thermal stresses. A ceramic material such as AN-191 may be used and will exhibit creep when exposed to tensile loads as a result of micro cracking of the material. Furthermore, it may be desired to maintain the elastic modulus of the core member material to be less than one-half that of the CMC airfoil member material, or in other embodiments to be less than one-third or less than one-tenth that of the CMC airfoil member material. The CMC airfoil member is the desired structural material and it is intended that the airfoil member bear the majority of the loads. If the modulus of the core is too high, the core, not the CMC airfoil member, takes the loads.

The required thermal conductivity of the core member material will depend upon the overall heat load, the number and location of the cooling channels 30, and the thermal conductivity of the CMC airfoil member material. Generally, oxide CMC materials have lower thermal conductivity than do non-oxide based CMC materials, and thus a higher thermal conductivity core member material will be desirable for the oxide CMC materials.

Figure 5:
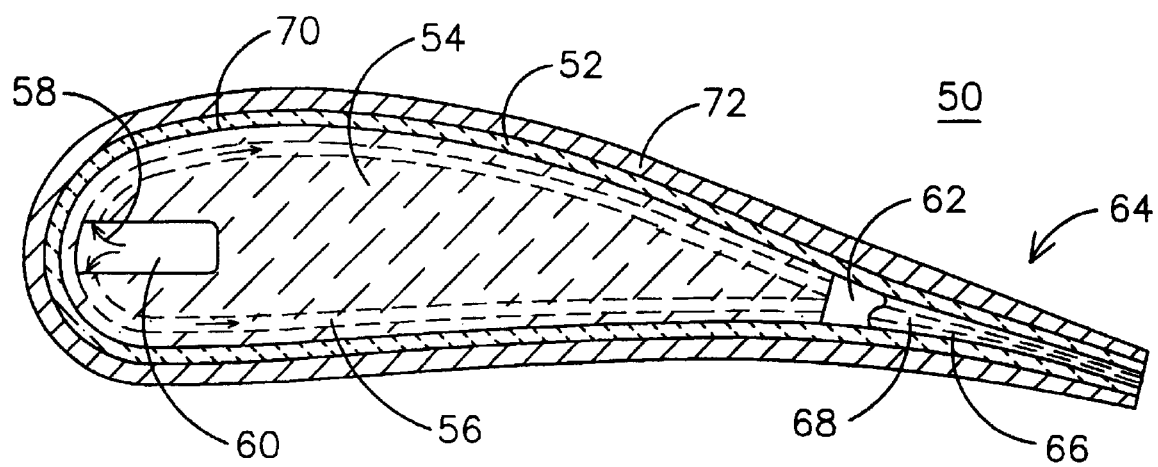
FIG. 5 is a cross-sectional view of a solid-core ceramic matrix composite gas turbine vane having a layer of thermal insulation deposited over the CMC material.

FIG. 5 illustrates another embodiment of an improved gas turbine vane 50. Vane 50 includes a ceramic matrix composite airfoil member 52 having a center that is substantially filled with a core member 54. A first plurality of cooling passages 56 (shown in phantom) are formed through the core member 54, with the cooling fluid 58 passing from an inlet plenum 60 formed along a length of the core member 54 into each respective cooling passage 56. The cooling passages are openings for cooling fluid 58 that are formed proximate the outside surface of the core member 54, and they may take the form of subsurface holes (as illustrated in FIG. 5) or grooves formed in the surface of the core member (as illustrated in FIGS. 2–4). The cooling passages 56 terminate in an outlet plenum 62 formed along the length of the vane 50 proximate a trailing edge portion 64. The outlet plenum functions to redistribute the cooling fluid 58 into the respective inlets of a second plurality of cooling passages 66 formed proximate the trailing edge 64 for eventual discharge into the hot combustion gas passing over the vane 50. One may appreciate that as the cross-sectional thickness of the vane 50 decreases and the temperature of the cooling fluid 58 increases toward the trailing edge portion 64, the cooling requirements for the vane 50 change. Thus, the outlet plenum 62 provides a transition location for establishing a different cooling passage geometry for the trailing edge portion 64. In one embodiment, the number of trailing edge cooling passages 66 is twice the number of cooling passages 56 upstream of the outlet plenum 62, and the size of each respective trailing edge cooling passage 66 is reduced accordingly. Trailing edge cooling passages 66 may be formed as subsurface holes or grooves in a surface of a trailing edge portion 68 of core member 54. In this embodiment, the bond 70 between the airfoil member 52 and the core member 54 encompasses 100% of the surface area of the inside surface of the airfoil member 52 local to the trailing edge region. The bond 70 provides a heat transfer path from the airfoil member 52 to the cooling fluid 58.

The trailing edge portion 68 of the core member 54 of FIG. 5 is fabricated to be a separate piece of material from the remainder of the core member 54. One may appreciate that in other embodiments the core member may be formed of one, two or more separate sections of material. The interface between such sections may be spaced apart as shown in FIG. 5 to form a plenum, or they may be in close contact. A multiple section core may be beneficial for limiting the stresses generated within the core. The joint between such sections may be located along any axis of the airfoil; for example, extending from the leading edge to the trailing edge along the length of the vane to join a top section and a bottom section, or extending from the low pressure side of the airfoil to the high pressure side of the airfoil along the length of the vane to join a leading edge section and a trailing edge section, or extending from the leading edge to the trailing edge along the cord of the airfoil to join an inner section and an outer section. The various sections may be formed of the same material or a different material. In one embodiment, the trailing edge portion 68 of FIG. 5 may be formed of a CMC material while the remainder of the core 54 may be formed of AN-191 material.

Vane 50 of FIG. 5 also includes a layer of insulating material 72 disposed over the airfoil member 52. Insulating material 72 may be of the composition described in U.S. Pat. No. 6,197,424 or other appropriate insulating material, and may be formed (cast) or machined to provide a desired airfoil shape. The airfoil member 52 may be commercially available A-N720 CMC material (from COI Ceramics, San Diego, Calif.) having mullite-alumina Nextell 720 reinforcing fibers in an alumina matrix, or it may be any other appropriate oxide or non-oxide CMC material. The core member material may be commercially available AN-191 (Saint-Gobain, Worcester, Mass.), for example, or it may be a material having properties specially selected as described above for a particular application.

Thus, the hybrid vane of the present invention utilizes an efficient internal cooling scheme and a thermal barrier coating layer to permit the use of an 1,100° C. oxide CMC structural vane in a 1,600° C. combustion environment. The solid core with integral cooling channels and supply plenum is constructed of a material selected to improve the heat transfer and to minimize the stress at the bond interface. In addition, the solid core reduces the stress in the CMC layer caused by the internal cooling fluid pressure.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A turbine component comprising:
   a ceramic matrix composite member having an inside surface defining a core region;
   a core member disposed in the core region and joined to the ceramic matrix composite member by a bond including at least 30% of the inside surface of the ceramic matrix composite member; and
   a cooling channel formed in the core member for the passage of a cooling fluid;
   wherein a coefficient of thermal expansion of the core member is at least 10% greater than a coefficient of thermal expansion of the ceramic matrix composite member.

2. A turbine component comprising:
   a ceramic matrix composite member having an inside surface defining a core region;
   core member disposed in the core region and joined to the ceramic matrix composite member by a bond including at least 30% of the inside surface of the ceramic matrix composite member; and
   a cooling channel formed in the core member for the passage of a cooling fluid;
   wherein a coefficient of thermal expansion of the core member is in the range of >0 to 14% greater than a coefficient of thermal expansion of the ceramic matrix composite member.

3. A turbine component comprising:
   a ceramic matrix composite member having an inside surface defining a core region;
   a core member disposed in the core region and joined to the ceramic matrix composite member by a bond including at least 30% of the inside surface of the ceramic matrix composite member; and
   a cooling channel formed in the core member for the passage of a cooling fluid;
   wherein the core member has a mechanical strength that is less than a
   mechanical strength of the bond.

4. A turbine component comprising:
   a ceramic matrix composite member having an inside surface defining a core region;
   a core member disposed in the core region and joined to the ceramic matrix composite member by a bond including at least 30% of the inside surface of the ceramic matrix composite member; and
   a cooling channel formed in the core member for the passage of a cooling fluid;
   wherein a ratio of an elastic modulus of the core member to an elastic modulus of the ceramic matrix composite member is less than one half.

5. The turbine component of claim 4, wherein a ratio of an elastic modulus of the core member to an elastic modulus of the ceramic matrix composite member is less than one third.

6. The turbine component of claim 4, wherein a ratio of an elastic modulus of the core member to an elastic modulus of the ceramic matrix composite member is less than one tenth.

7. A turbine component comprising:
   a ceramic matrix composite member having an inside surface defining a core region;
   a core member disposed in the core region and joined to the ceramic matrix composite member by a band including at least 30% of the inside surface of the ceramic matrix composite member; and
   a cooling channel formed in the core member for the passage of a cooling fluid;
   wherein the cooling channel comprises a groove formed in an outer
   surface of the core member.

8. The turbine component of claim 7, further comprising a layer of an insulating material disposed over the outside surface of the ceramic matrix composite member.

9. The turbine component of claim 8, where an outside surface of the insulating material comprises an airfoil shape.

10. A turbine component comprising:
    a ceramic matrix composite member having an inside surface defining a core region;
    a corn member disposed in the core region and joined to the ceramic matrix composite member by a bond including at least 30% of the inside surface of the ceramic matrix composite member; and
    a cooling channel formed in the core member for the passage of a cooling fluid;
    wherein the cooling channel comprises:
        an inlet plenum formed along a length of the core member;
        a first plurality of grooves formed proximate an outside surface of the core member; and
        an opening between the inlet plenum and each of the first plurality of grooves.

11. The turbine component of claim 10, further comprising:
    each of the first plurality of grooves terminating in an outlet plenum formed along the length of the core member; and
    a second plurality of grooves having respective inlets connected to the outlet plenum and extending proximate a trailing edge of the turbine vane.

12. A turbine component comprising:
    a ceramic matrix composite member having an inside surface defining a core region;
    a core member disposed in the core region and joined to the ceramic matrix composite member by a bond including at least 30% of the inside surface of the ceramic matrix composite member; and
    a cooling channel formed in the core member for the passage of a cooling fluid;
    wherein a first section of the core member comprises a material different than a second section of the core member.

13. The turbine component of claim 12, wherein the second section comprises a trailing edge section spaced apart from the first section to define a plenum.

14. The turbine component of claim 13, further comprising a first number of cooling channels formed in the first section and a second number of cooling channels different than the first number formed in the section.

15. A turbine component comprising:
    a ceramic matrix composite member having an inner surface defining a core region;
    a core member disposed in the core region and bonded to the ceramic matrix composite member inner surface;

a cooling channel formed in the core member for the passage of a cooling fluid for removing heat from the core member, the bond between the core member and the ceramic matrix composite member providing a conductive heat removal pathway between the ceramic matrix composite member and the core member;

wherein the core member is formed of a material having a mechanical strength that is less than a mechanical strength of the bond in order to safeguard the integrity of the heat removal pathway.

16. The turbine component of claim 15, wherein the core member is bonded to the ceramic matrix composite member by a bond including at least 30% of the inner surface of the ceramic matrix composite member.

17. The turbine component of claim 15, wherein the core member is bonded to the ceramic matrix composite member by a bond including at least 50% of the inner surface of the ceramic matrix composite member.

18. The turbine component of claim 15, wherein the core member is bonded to the ceramic matrix composite member by a bond including at least 75% of the inner surface of the ceramic matrix composite member.

19. The turbine component of claim 15, wherein the core member is bonded to the ceramic matrix composite member by a bond including at least 80% of the inner surface of the ceramic matrix composite member.

20. The turbine component of claim 15, wherein a coefficient of thermal expansion of the core member is at least 10% greater than a coefficient of thermal expansion of the ceramic matrix composite member.

21. The turbine component of claim 15, wherein a coefficient of thermal expansion of the core member is in the range of >0 to 14% greater than a coefficient of thermal expansion of the ceramic matrix composite member.

22. The turbine component of claim 15, wherein a ratio of an elastic modulus of the core member to an elastic modulus of the ceramic matrix composite member is less than one half.

23. The turbine component of claim 15, wherein a ratio of an elastic modulus of the core member to an elastic modulus of the ceramic matrix composite member is less than one third.

24. The turbine component of claim 15, wherein a ratio of an elastic modulus of the core member to an elastic modulus of the ceramic matrix composite member is less than one tenth.

25. The turbine component of claim 15, further comprising a layer of an insulating material disposed over the outside surface of the ceramic matrix composite member.

26. The turbine component of claim 25, where an outside surface of the insulating material comprises an airfoil shape.

27. The turbine component of claim 15, wherein the core member comprises a plurality of sections.

28. The turbine component of claim 27, wherein a first section of the core member comprises a material different than a second section of the core member.

29. The turbine component of claim 28, wherein the second section comprises a trailing edge section spaced apart from the first section to define a plenum.

30. The turbine component of claim 29, further comprising a first number of cooling channels formed in the first section and a second number of cooling channels different than the first number formed in the section.

31. The turbine component of claim 15, wherein the cooling channel comprises a groove formed in an outer surface of the core member.

32. The turbine component of claim 15, wherein the cooling channel comprises a passage formed through the core member.

33. A turbine component comprising:

a ceramic matrix composite member having an inner surface defining a core region;

a core member disposed in the core region and bonded to the ceramic matrix composite member inner surface;

wherein a coefficient of thermal expansion of the core member is greater than a coefficient of thermal expansion of the ceramic matrix composite member.

34. A turbine component comprising:

a ceramic matrix composite member having an inner surface defining a core region;

a core member disposed in the core region and bonded to the ceramic matrix composite member inner surface by a bond, the bond providing a conductive heat removal pathway between the ceramic matrix composite member and the core member;

wherein the core member is formed of a material having a mechanical strength that is less than a mechanical strength of the bond in order to safeguard the integrity of the heat removal pathway.

35. A tribute component comprising:

a ceramic matrix composite member having an inner surface defining a core region;

a core member disposed in the core region and bonded to the ceramic matrix composite member inner surface;

wherein a ratio of an elastic modulus of the core member to an elastic modulus at the ceramic matrix composite member is less than one half.

36. A turbine component comprising:

a ceramic matrix composite member having an inner surface defining a core region;

a core member having groove formed in an outer surface, the core member disposed in the core region and bonded to the ceramic matrix composite member inner surface with the groove defining a cooling passage for directing a cooling fluid between the core member and the ceramic matrix composite member.

* * * * *

UNITED STATES PATENT AND TRADEMARK OFFICE
CERTIFICATE OF CORRECTION

PATENT NO. : 6,709,230 B2
DATED : March 23, 2004
INVENTOR(S) : Jay A. Morrison et al.

It is certified that error appears in the above-identified patent and that said Letters Patent is hereby corrected as shown below:

Column 7,
Line 24, before "core" insert -- a --.

Column 8,
Line 5, cancel "band" and substitute -- bond --.
Line 22, cancel "corn" and substitute -- core --.

Column 10,
Line 37, cancel "tribute" and substitute -- turbine --.
Line 44, cancel "at" and substitute -- of --.
Line 49, before "groove" insert -- a --.

Signed and Sealed this

Eighteenth Day of October, 2005

JON W. DUDAS
*Director of the United States Patent and Trademark Office*